US011748560B2

(12) United States Patent
Teng et al.

(10) Patent No.: US 11,748,560 B2
(45) Date of Patent: Sep. 5, 2023

(54) CONVERTING BETWEEN TABULAR AND STRUCTURED DATA FORMATS

(71) Applicant: Kyndryl, Inc., New York, NY (US)

(72) Inventors: Qi Ming Teng, Beijing (CN); Christopher Peter Baker, East Sussex (GB); Sai Zeng, Yorktown Heights, NY (US); Jun Duan, Mount Kisco, NY (US)

(73) Assignee: Kyndryl, Inc., New York, NY (US)

( * ) Notice: Subject to any disclaimer, the term of this patent is extended or adjusted under 35 U.S.C. 154(b) by 377 days.

(21) Appl. No.: 16/993,827

(22) Filed: Aug. 14, 2020

(65) Prior Publication Data

US 2022/0050962 A1    Feb. 17, 2022

(51) Int. Cl.
| | |
|---|---|
| *G06F 17/00* | (2019.01) |
| *G06F 40/205* | (2020.01) |
| *G06F 16/25* | (2019.01) |
| *G06F 40/18* | (2020.01) |
| *G06F 40/103* | (2020.01) |
| *G06F 16/22* | (2019.01) |

(52) U.S. Cl.
CPC ........ *G06F 40/205* (2020.01); *G06F 16/2237* (2019.01); *G06F 16/258* (2019.01); *G06F 40/103* (2020.01); *G06F 40/18* (2020.01)

(58) Field of Classification Search
CPC .. G06F 40/205; G06F 16/2237; G06F 16/258; G06F 40/103; G06F 40/18
See application file for complete search history.

(56) References Cited

U.S. PATENT DOCUMENTS

| | | | | |
|---|---|---|---|---|
| 6,421,662 | B1 * | 7/2002 | Karten | G06F 16/2237 |
| 8,321,478 | B2 * | 11/2012 | Fong | G06F 40/151 |
| | | | | 707/756 |
| 9,128,895 | B2 * | 9/2015 | Chan | G06F 15/173 |
| 9,158,831 | B2 * | 10/2015 | Zhuge | G06F 16/284 |
| 9,165,086 | B2 * | 10/2015 | Idicula | G06F 3/0631 |

(Continued)

FOREIGN PATENT DOCUMENTS

| | | |
|---|---|---|
| CN | 107622080 A | 1/2018 |
| EP | 1452974 A2 | 9/2004 |
| JP | 2007094971 A | 4/2007 |
| JP | 2020047254 A | 3/2020 |

OTHER PUBLICATIONS

Converting JSON to CSV and back again using Python; May 23, 2019, Sean Conroy; 13 pages (Year: 2019).*

(Continued)

*Primary Examiner* — Mohammed H Zuberi
(74) *Attorney, Agent, or Firm* — Dan Housley; Andrew M. Calderon; Calderon Safran & Cole, P.C.

(57) ABSTRACT

Aspects of the present disclosure relate to converting between structured and tabular data formats. Data can be received in a tabular format. An array can be built for each of a plurality of objects within the data in the tabular format, each object corresponding to at least one identified header of the identified headers. A data row can be parsed using at least one of the built arrays and data within the data row can be added to the structured format in a specific location based characteristics indicated in the at least one array. Data can also be converted from the structured format into the tabular format using the built arrays.

20 Claims, 12 Drawing Sheets

(56) References Cited

U.S. PATENT DOCUMENTS

| | | | | |
|---|---|---|---|---|
| 9,396,284 | B2* | 7/2016 | Arora | G06F 16/8358 |
| 9,442,977 | B2* | 9/2016 | Falter | G06F 16/288 |
| 9,613,067 | B2* | 4/2017 | Chang | G06F 16/288 |
| 9,619,552 | B2* | 4/2017 | Falter | G06F 16/288 |
| 9,639,572 | B2* | 5/2017 | Hutzel | G06F 16/2445 |
| 10,037,311 | B2* | 7/2018 | Idicula | G06F 40/143 |
| 10,095,758 | B2* | 10/2018 | Hutzel | G06F 16/288 |
| 10,528,548 | B2* | 1/2020 | Hutchins | G06F 16/2228 |
| 11,321,285 | B2* | 5/2022 | Krishnamoorthy | G06F 16/2282 |
| 11,436,249 | B1* | 9/2022 | Zhang | G06F 16/258 |
| 2005/0132278 | A1* | 6/2005 | Yoshida | G06F 16/84 715/239 |
| 2007/0011184 | A1* | 1/2007 | Morris | G06F 40/154 |
| 2017/0052988 | A1* | 2/2017 | Guggilla | G06V 30/416 |
| 2017/0316068 | A1* | 11/2017 | Greene | G06F 16/252 |
| 2020/0097541 | A1* | 3/2020 | Christianson | G06F 16/3323 |
| 2021/0042309 | A1* | 2/2021 | Mustafi | G06F 16/258 |

OTHER PUBLICATIONS

Normalizing a CSV file using MySQL, Dan Goldin, https://dangoldin.com/2014/10/01/normalizing-a-csv-file-using-mysql/ (Year: 2014).*
Unknown, "Mr. Data Converter", printed Jul. 9, 2020, 1 page <https://thdoan.github.io/mr-data-converter/>.
Unknown, "Convert CSV to JSON", printed Jul. 9, 2020, 2 pages <https://www.convertcsv.com/csv-to-json.htm>.
Unknown, "CSVJSON", printed Jul. 9, 2020, 4 pages <https://www.csvjson.com/csv2json>.
Unknown, "Excel Into JSON", printed Jul. 9, 2020, 2 pages <https://www.microsoft.com/en-us/p/excel-into-json/9p3b2s2k2qhb>.
Shigarov, A., "A Journey of Tabular Information from Unstructured to Structured Data World Using a Rule Engine", Oct. 18, 2014, 38 pages.
Mell et al., "The NIST Definition of Cloud Computing", Recommendations of the National Institute of Standards and Technology, Sep. 2011, 7 pages.

* cited by examiner

CONVERTING BETWEEN TABULAR AND STRUCTURED DATA FORMATS

BACKGROUND

The present disclosure relates generally to the field of data formatting, and in particular, to converting between tabular and structured data formats.

Data can be represented in a variety of manners. The format in which data is represented can depend on the application the data is used for (e.g., text data, image data, audio data, etc.). Manipulating and visualizing data can depend on the format the data stored in.

SUMMARY

Embodiments of the present disclosure relate to a method, system, and computer program product for converting data from a tabular format to a structured format. Data can be received in the tabular format. An array can be built for each of a plurality of objects within the data in the tabular format, each object corresponding to at least one identified header of the identified headers. A data row can be parsed using at least one of the built arrays and data within the data row can be added to the structured format in a specific location based on characteristics indicated in the at least one array.

Embodiments of the present disclosure further relate to a method, system, and computer program product for converting data from a structured format to a tabular format. Data can be received in the structured format. Leaf nodes of a schema representing hierarchy of objects within the structured format can be selected as headers. The headers can be added to the tabular format. An array for each object within the structured format can be built. Data from the structured format can be added to the tabular format using at least one of the built arrays by storing data in proper rows and columns of the tabular format based on characteristics included in each array.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
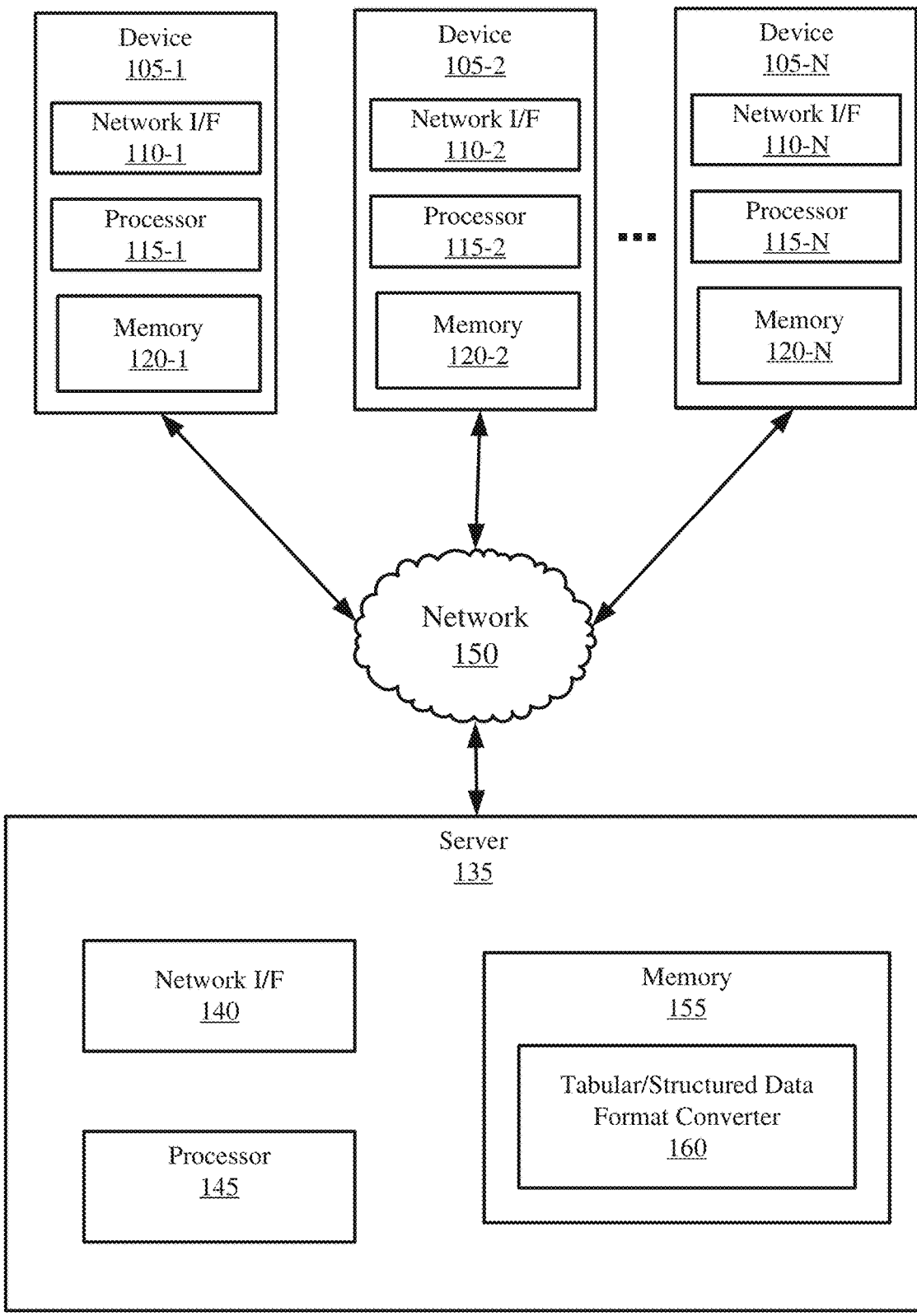
FIG. 1 depicts a diagram illustrating an example computing environment in which illustrative embodiments of the present disclosure may be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of data formatting, and in particular to converting between tabular and structured data formats. While the present disclosure is not necessarily limited to such applications, various aspects of the disclosure can be appreciated through a discussion of various examples using this context.

Data can be captured in structured formats such as JavaScript Object Notation (JSON), YAML Ain't Markup Language (YAML), Extensive Markup Language (XML), and others. Though these structured data formats are convenient for humans and machines to understand, data represented in a tabular format can be more convenient to work with in particular applications (e.g., engineering). For example, data represented in a tabular format may be relatively easier to manipulate, summarize, and filter. On the other hand, structured data may be relatively easier for modern tools and services (e.g., web-based application) to process. As such, there is a need for a generic solution to convert data between structured (e.g., JSON, YAML, XML) and tabular (e.g., XLS) formats, due to the relative benefits of each with respect to each other in particular environments. Aspects of the present disclosure relate to converting data from a tabular to a structured format, and vice versa.

Turning now to the Figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively devices 105), at least one server 135, and a network 150.

Consistent with various embodiments, the server 135 and the devices 105 are computer systems. The devices 105 and the server 135 include one or more processors 115-1, 115-2 . . . 115-N (collectively processors 115) and 145 and one or more memories 120-1, 120-2 . . . 120-N (collectively memories 120) and 155, respectively. The devices 105 and the server 135 can be configured to communicate with each other through internal or external network interfaces 110-1, 110-2 . . . 110-N (collectively network interfaces 110) and 140. The network interfaces 110 and 140 are, in some embodiments, modems or network interface cards. The devices 105 and/or the server 135 can be equipped with a display or monitor. Additionally, the devices 105 and/or the server 135 can include optional input devices (e.g., a keyboard, mouse, scanner, video camera, eye-tracking device, wearable device, or other input device), and/or any commercially available or custom software (e.g., browser software, communications software, server software, natural language processing software, search engine and/or web crawling software, etc.). The devices 105 and/or the server 135 can be servers, desktops, laptops, or hand-held devices.

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other and communicate via any appropriate local communication medium. For example, the devices 105 and the server 135 can communicate using a local area network (LAN), one or more hardwire connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment, or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150.

The server 135 includes a tabular/structured data format converter (TSDFC) 160. The TSDFC 160 can be configured to convert data represented in a tabular format to a structured format, and vice versa. To convert data from a tabular format to a structured format, the TSDFC 160 can be configured to receive data in a tabular format. Thereafter, headers within the table can be identified (e.g., by parsing a schema representing the table and identifying leaf nodes within the schema) and added to a header list. Further, a hierarchy of governing arrays can be generated based on the schema. Each array can correspond to an object within the schema, and it can be mapped to one or more columns in the table.

In embodiments, the governing arrays are data structures that can include data with respect to an object in the table such as identification number, level, column number(s), parent identification, and other data. The governing arrays can be called on by computer instructions to parse data within the table.

The first data row within the table can then be parsed using the governing arrays and the data within the first row of the table can be appended under objects within the structured format based on the positions specified in each governing array. Subsequent data rows can then be parsed using the governing arrays, iteratively, until all data within the table is appended under respective objects within the structured format. The above-mentioned functionalities for converting data in a tabular format to a structured format are further discussed with respect to FIGS. 2-6.

The TSDFC 160 can further be configured to convert data from a structured format to a tabular format. To do so, the TSDFC 160 can first be configured to receive data in a structured format (e.g., JSON, YAML, XML). Thereafter, the TSDFC 160 can be configured to parse leaf nodes within a schema derived from the structured data to identify headers within the structured data. The schema may be provided separately as it applies to all associated objects that are of the given structured format. A hierarchy of governing arrays can be generated for each array object within the structured data. The identified headers can then be dumped (e.g., stored) into a table. The data within the structured format can then be dumped into correct locations within the table using the governing arrays. The above-mentioned functionalities for converting data in a structural format to a tabular format are further discussed with respect to FIGS. 7-9.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Figure 2:
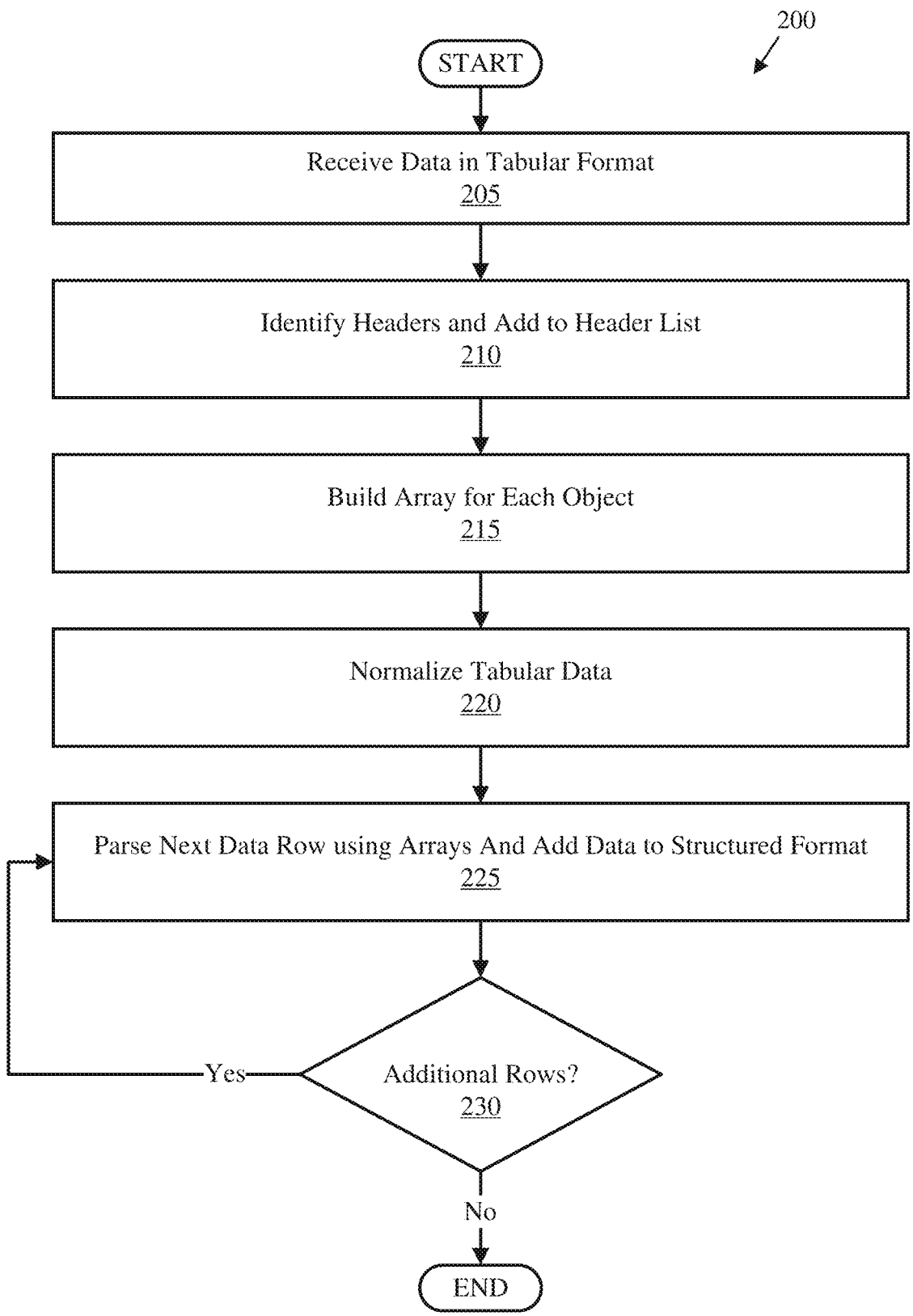
FIG. 2 is a flow-diagram depicting an example method for converting data in a tabular format to a structured format, in accordance with embodiments of the present disclosure.

Referring now to FIG. 2, shown is a flow-diagram of an example method 200 for converting data in a tabular format to a structured format, in accordance with embodiments of the present disclosure.

Method 200 initiates at operation 205, where data is received in a tabular format. Data received in a tabular format can be organized into a predominantly tabular/columnar structure. Tabular formats support aspects such as headers, data types, variables, units, comments, and graphical structures. Tables can be specified in a variety of software applications, including word processing applications, spreadsheet applications, presentation software, hypertext markup language (HTML), XLS files, XLSX files, and others.

Upon receiving data in a tabular format, headers within the table are identified and added to a header list. This is illustrated at operation 210. In embodiments, the headers can be formatted with fully qualified path names and variants thereof (e.g., see element 310 of FIG. 3). In some embodiments, the headers can be formatted in a hierarchical manner (e.g., see element 315 of FIG. 3). In some embodiments, headers can be identified by identifying leaf nodes of a schema (e.g., a root tree structure) that represents the data within the table. For example, leaf nodes can include lower level headers (i.e., objects) within the table. An example schema that can be extracted/generated from a table is depicted in element 810 of FIG. 8. The header list can then be added to a structured data format (e.g., JSON).

A governing array is then built for each array object within the schema. This is illustrated at operation 215. A governing array is a data structure that captures characteristics of array objects within the table. Such arrays can be hierarchically organized. That is, arrays can be superior and/or subordinate to one another. Arrays can include an identification, a parent identification (e.g., a superior object identification number), a level, column number(s), and/or row number(s) associated with an object. This information can be used to store data in a proper location within the structured format. Example arrays that describe data within a table are depicted in element 320 of FIG. 3.

Figure 4:
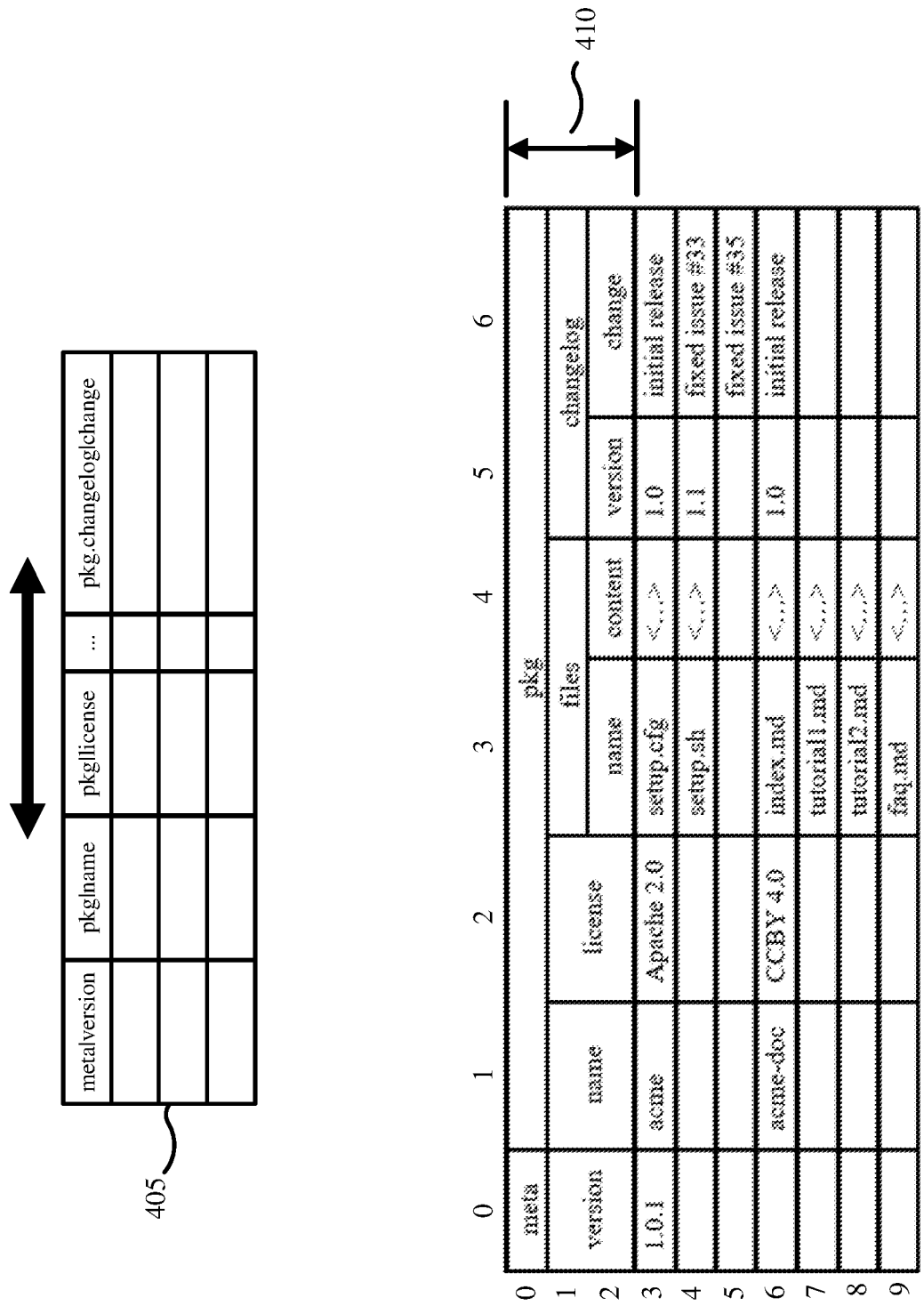
FIG. 4 is a diagram depicting preprocessing techniques such that a table can be converted into a structured format, in accordance with embodiments of the present disclosure.

The tabular data is then normalized. This is illustrated at operation 220. In some embodiments, normalizing tabular data can include adjusting header order and validating the columns. In some embodiments, rather than normalizing the tabular data, a header depth can be determined such that the header depth can be considered when dumping the data within the table into a structured format. As an example, if a header spans three rows, the header depth can be defined as three. However, the header depth may default to a value of one. Thus, when dumping data into the table, the data is not dumped into rows designated as headers based on the header depth. Examples for preprocessing tabular data are depicted in FIG. 4.

Figure 5:
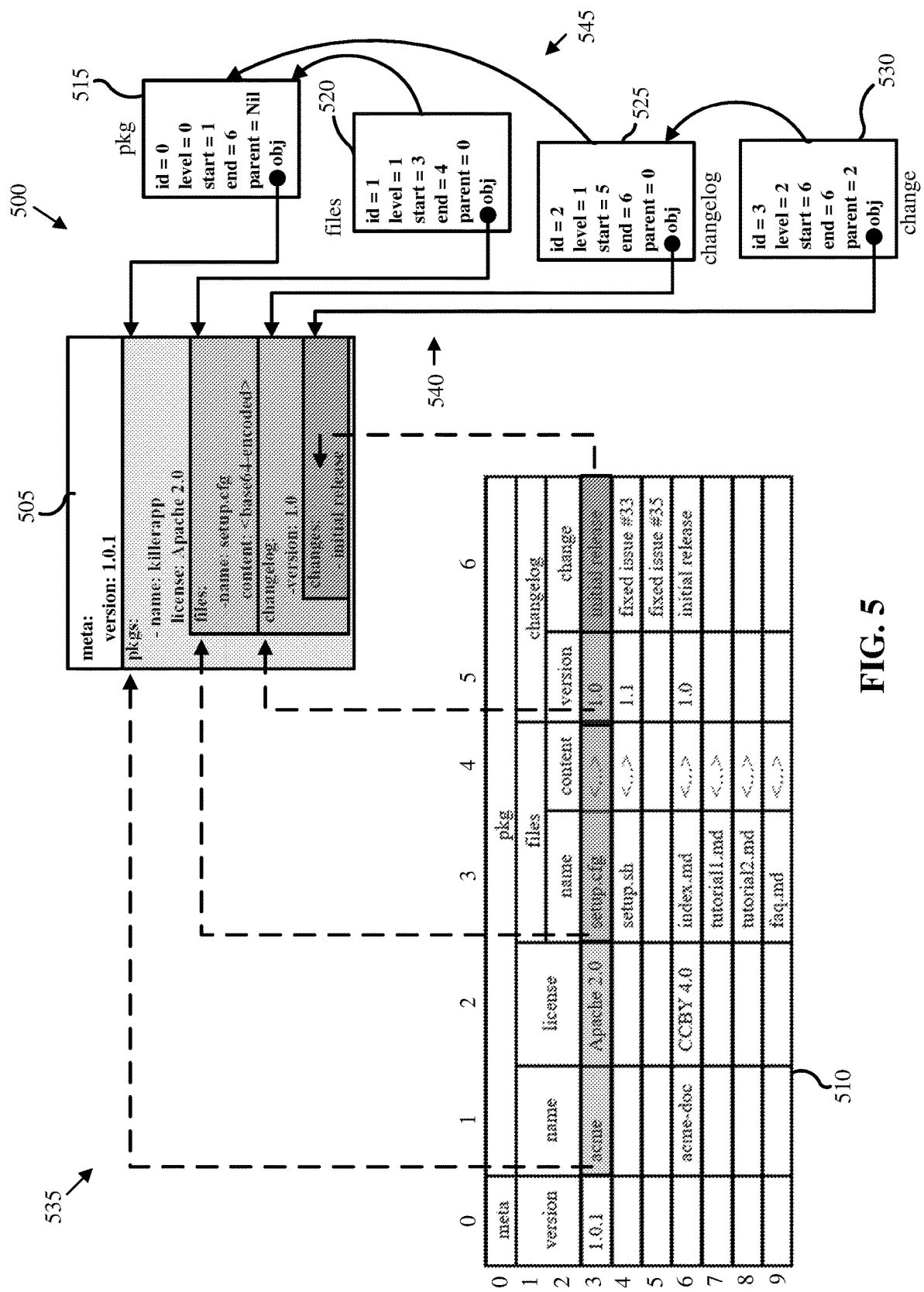
FIG. 5 is a diagram depicting the dumping of a first data row into a structured format by parsing a governing array, in accordance with embodiments of the present disclosure.

A next data row within the table is then parsed and appended to the structured format. This is illustrated at operation 225. After headers are added into the structured format (e.g., at operation 210), the next data row is parsed and data is input into the structured format using the governing array generated at operation 215. Thus, the governing array for each array object is used to insert the data into proper lines (under the proper headers) within the structured format. An example depicting the appending of a first data row to the structured format is depicted in FIG. 5.

A determination is made whether there are additional rows of data to be added to the structured format. This is illustrated at operation 230. If there are additional rows to be added to the structured format, method 200 returns to operation 225, where the next data row is parsed using the governing array and the data from the table is appended to the structured format at a proper location. If there are no additional rows, then method 200 ends, as all the data within the table has been added to the structured format. Thus, upon determining that the last row has been added to the structured format, a determination can be made that the data originally stored in the tabular format has been successfully converted into the structured format.

The aforementioned operations can be completed in any order and are not limited to those described. Additionally, some, all, or none of the aforementioned operations can be completed, while still remaining within the spirit and scope of the present disclosure.

Figure 3:
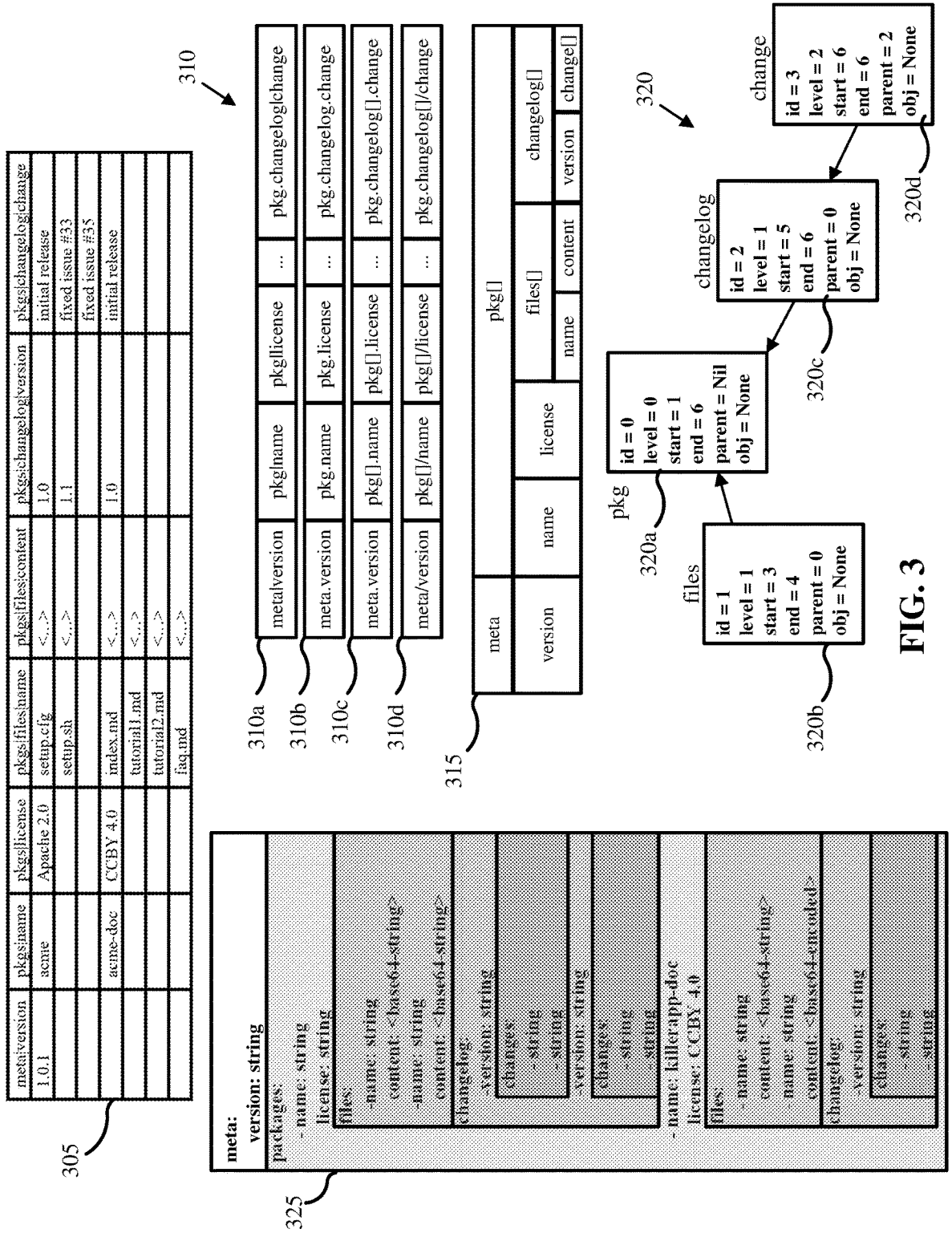
FIG. 3 is a diagram depicting a table, a data structure, header lists, and governing arrays, in accordance with embodiments of the present disclosure.

Referring now to FIG. 3, shown is an example table 305 that can be converted into a data structure 325 (or be accompanied by such a data structure), in accordance with embodiments of the present disclosure. Further, FIG. 3 also depicts header lists 310 and 315 that can be identified from the table 305 (e.g., at operation 210 of FIG. 2) and a governing array 320 that can be generated (e.g., at operation 215 of FIG. 2) using the table 305.

As depicted in FIG. 3, the table 305 includes headers and corresponding data underneath each header. The headers within the table 305 can be identified and added to a header list 310 and/or 315. The header lists 310 depict example headers with fully qualified path names or variants thereof. A first header list 310*a* includes a first path name header list in a first format, a second header list 310*b* includes a second path name header list in a second format, a third header list 310*c* includes a third path name header list in a third format, and a fourth header list 310*d* includes a fourth path name header list in a fourth format. Alternatively, the header list can be formatted in a hierarchical manner, shown by hierarchical header list 315, depicting object hierarchy among objects within the table 305.

The governing array 320 can be generated using the table 305. In embodiments, the governing array 320 can be provided separately as it captures the overall data format for all similar data objects. The governing array 320 can capture characteristics of each array object within the table 305. If there are no array objects in the table, the conversion can be simple and straightforward.

As depicted in FIG. 3, a first object 320*a* corresponding to the "pkg" array has an identification (id) of 0, a level of 0 (e.g., "pkg" is at the highest hierarchy or "root node"), a starting column of 1, an ending column of 6, and no parent (nil), a second object 320*b* corresponding to the "files" array has an id of 1, a level of 1, a starting column of 3, an ending column of 4, and a parent with the id of 0, a third object 320*c* corresponding to the "changelog" array has an id of 2, a level of 1, a starting column of 5, an ending column of 6, and a parent with the id of 0, and a fourth object 320*d* corresponding to the "change" array has an id of 3, a level of 2, a starting column of 6, and ending column of 6, and a parent with the id of 2. The characteristics stored in each object are used to place data from the table 305 into the data structure 325. As depicted, the governing array 320 is hierarchically organized.

As depicted in the data structure 325, corresponding levels within the structured data format are shaded with different colors. Thus, packages array "pkg" corresponding to the $0^{th}$ level is shaded with a first color, array "files" and "changelog" corresponding to the $1^{st}$ level are shaded with a second color, and array "changes" corresponding to a $2^{nd}$ level is shaded with a third color. The bounding boxes surrounding each object depict area covered by each array within governing array 320.

Referring now to FIG. 4, shown are two examples for preprocessing a table such that data can be converted from a tabular format into a structured format, in accordance with embodiments of the present disclosure. Normalization 405 can include adjusting header (column) order and validating each column. This can be used when headers are represented by fully qualified path names. Alternatively, a header depth 410, can be determined such that the proper row where data begins can be determined. In this example, the header depth is 3, such that the first three rows (0, 1, and 2) can be identified as headers and data at or beyond the $3^{rd}$ row (rows 3-9) is defined as data. This can be beneficial in embodiments where object hierarchy is captured within headers.

Referring now to FIG. 5, shown is a diagram 500 depicting the dumping of data from a first data row (row 3) of a table 510 into a data structure 505, in accordance with embodiments of the present disclosure. As depicted in FIG.

5, a set of governing array objects 515-530 are used to place data from the table 510 into the data structure 505. In particular, the column numbers and levels (the area associated with each array) defined within the governing array objects 515-530 are used to place data under the correct header/line within the data structure 505. The governing array objects 515-530 each cover a respective area of the table 510 and data structure 505, depicted as shaded bounding boxes within the table 510 and data structure 505. Arrows 535 between the table 510 and data structure 505 show the mapping of corresponding bounding boxes covered by the same governing array object. Arrows 540 between the governing arrays 515-530 and data structure 505 depict the array used to dump each respective section of data from the table 510 into the data structure 505. Arrows 545 between respective governing arrays 515-530 depict array hierarchy (e.g., files and changelog are subordinate to pkg and change is subordinate to changelog).

For example, a first array object 515 corresponding to the array "pkg" is used to dump the name "acme" from first column under the first line of "pkgs" within the data structure 505 based on the starting column "1" within the first array object 515. Similarly, the license name "Apache 2.0" is placed under the second line of "pkgs" based its inclusion within the second column (e.g., covered by first array object 515). A second array object 520 corresponding to the array "files" is used to dump the name "setup.cfg" from the third column under the "files" header based on the column start "3." The second array object 520 is further used to dump the content (not shown in table) from the fourth column under the name "setup.cfg" within the header "files" based on the column end "4" within the second array object 520. A third array object 525 corresponding to the array "changelog" is used to dump the version number "1.0" under "changelog" based on the start column "5" within the third array object 525. Lastly, a fourth array object "change" is used to dump the change "initial release" under the "changes" header within the data structure 505 based on the starting and ending columns of 6 within the fourth array object 530.

Figure 6:
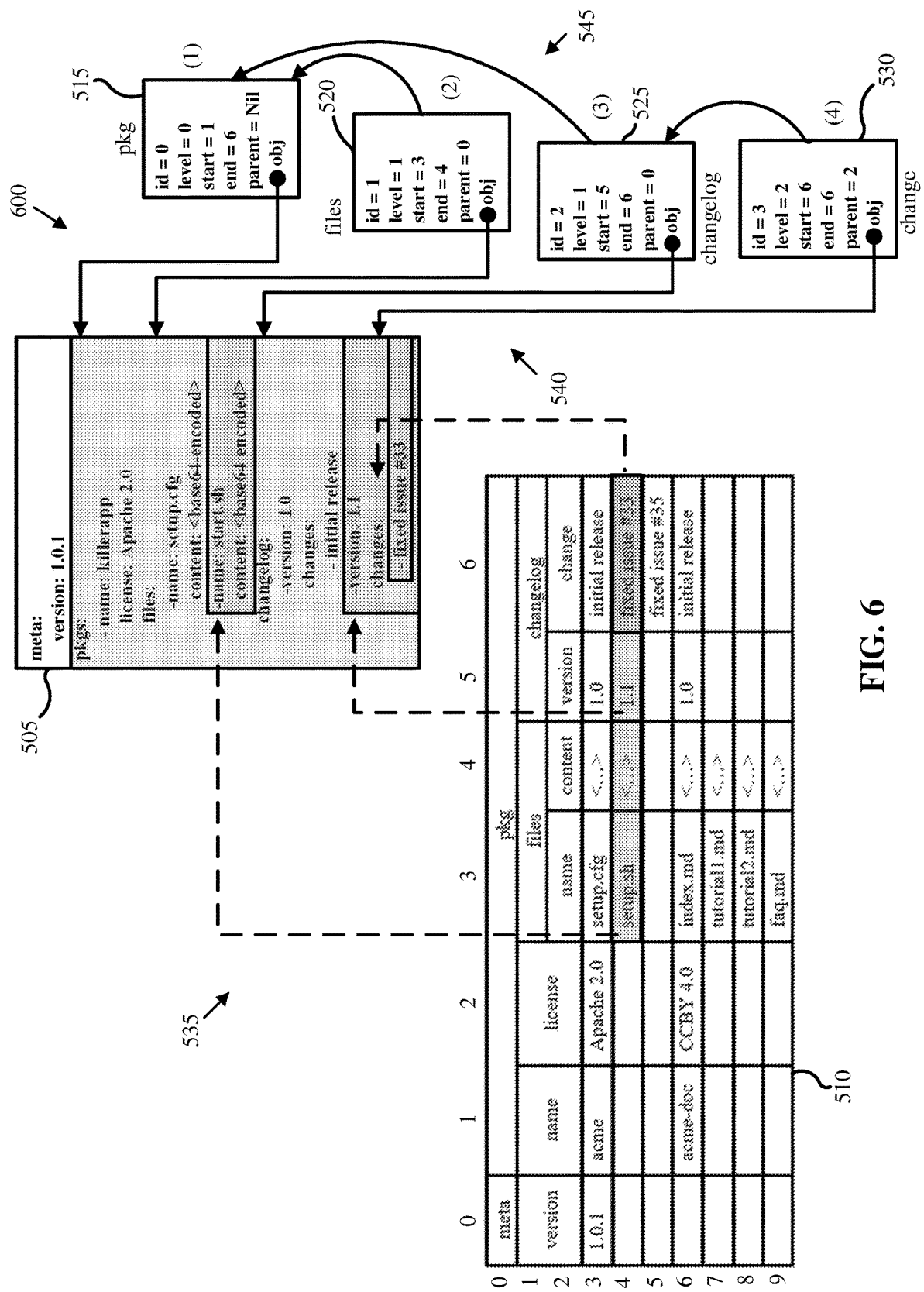
FIG. 6 is a diagram depicting the dumping of a second data row into a structured format by parsing a governing array, in accordance with embodiments of the present disclosure.

Referring now to FIG. 6, shown is a diagram 600 depicting the dumping of data from a second row (row 4) of the table 510 into the data structure 505. As depicted in FIG. 6, the set of governing array objects 515-530 are used to place data from the table 510 into the data structure 505.

As no data is included in the first and second columns, no data is placed directly under the object "pkg" within the data structure 505. However, the second array object 520 is the current context used to dump the name "start.sh" under the header "files" below the previously input name "setup.cfg" based on the starting column "3" within the second array object 520. The second array 520 is further used to dump the content (not shown in table 510) underneath the name "start.sh" based on the column end "4" within the second array. In one embodiment, the content is represented as base64-encoded strings even if the source data is binary. The third array object 525 is then used as the current context to dump the version "1.1" under the header "changelog" below the previous version "1.0" based on column start "5" within the third array 525. Lastly, the fourth array object 530 corresponding to the array "change" is used to dump the change "fixed issue #33" into the data structure 505 under version 1.1 changes based on the column start and end of "6." When there is no more item in the array "change" to be dumped, the parent of the array object 530 can be checked to see if there is another "changelog" object to dump. Similarly, when the current array of "changelog" is completely dumped, the parent of the array object 525 (object 520) can be checked to see if there are other items in the "files" array to dump. This process can repeat until there is no more item in the top level array "pkg", governed by the array object 515, to dump. When scanning each row in the tabular data, the corresponding governing array object can be identified by the combination of the existence of data and the column number.

Referring to FIG. 6, when scanning data on row 5, the first 6 columns are all empty. The real data starts from column 6. This means the governing array is array object 530, which corresponds to the data array "change". The array object 530 is then used to extract data from the table 510 into the "change" array, as a new item into the current context.

Figure 7:
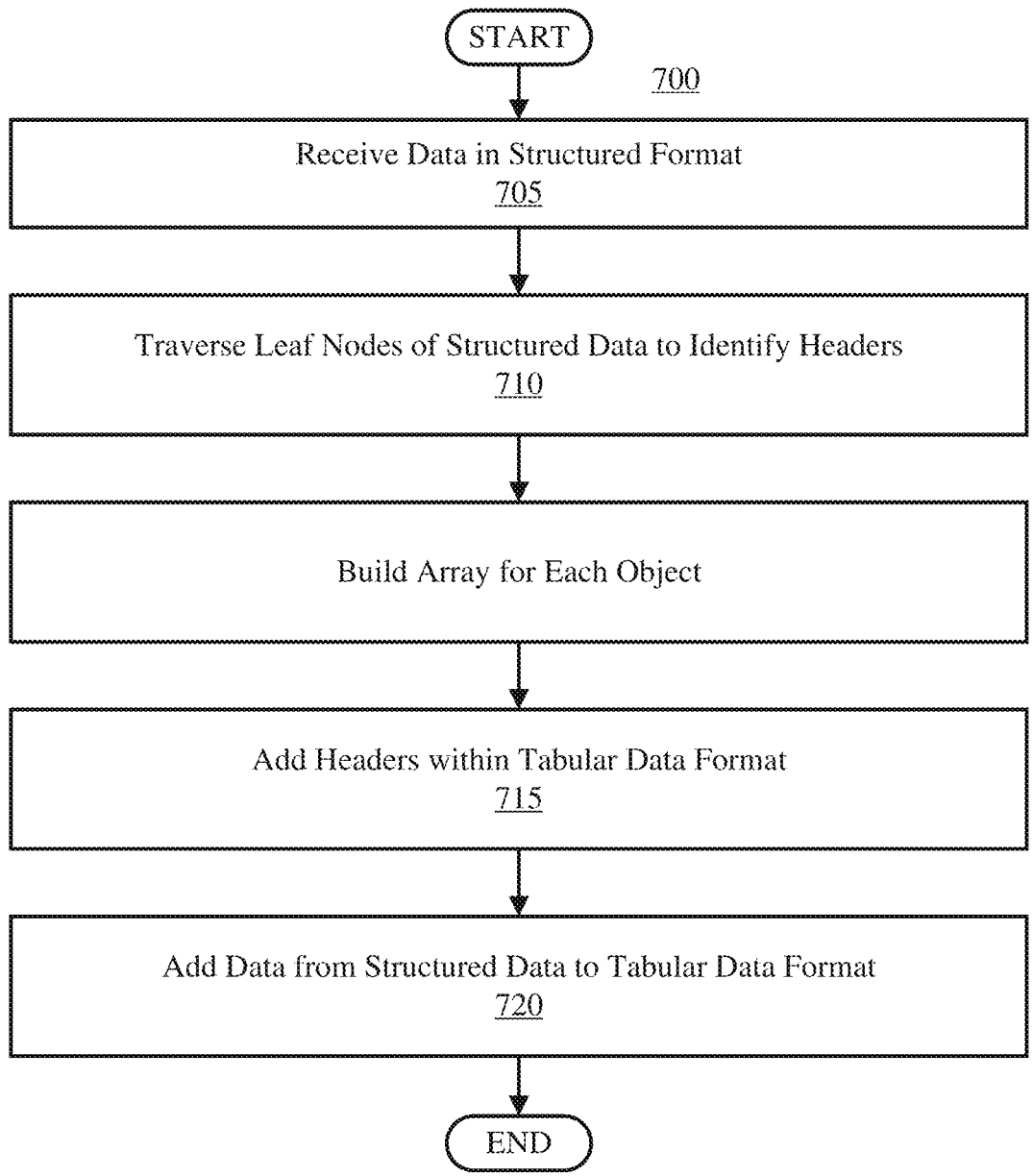
FIG. 7 is a flow-diagram depicting an example method for converting data in a structured format to a tabular format, in accordance with embodiments of the present disclosure.

Referring now to FIG. 7, shown is an example method for converting data from a structured format into a tabular format, in accordance with embodiments of the present disclosure.

Method 700 initiates at operation 705, where data is received in a structured format. The structured format can be an object notation where human text stores and transmits data objects including attribute-value pairs and arrays. Examples of structured formats include JSON, XML, YAML, concise binary object representation (CBOR), MessagePack, Smile, and UBJSON.

Figure 8:
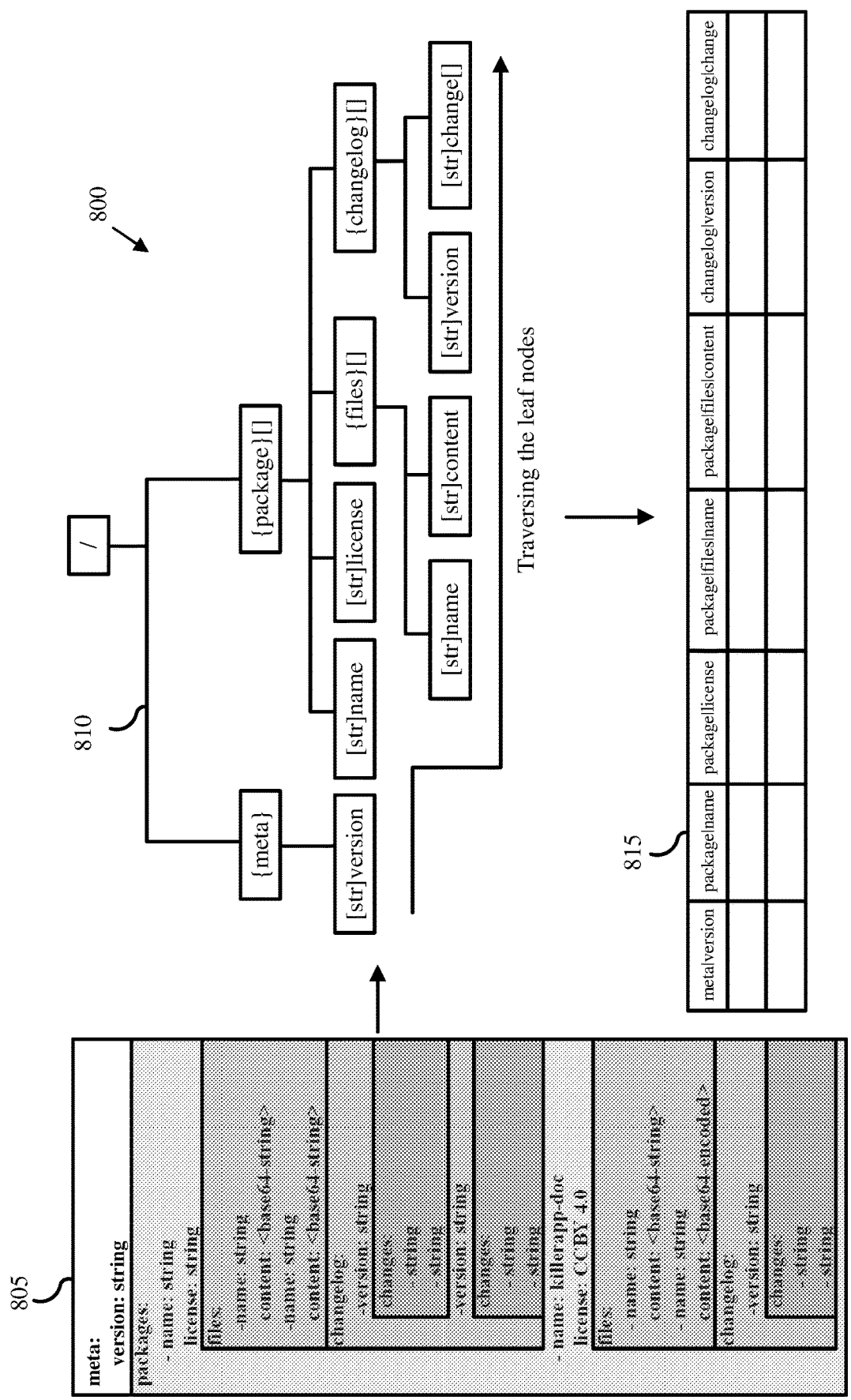
FIG. 8 is a diagram depicting the identification of headers from a data structure and the addition of the headers into a table, in accordance with embodiments of the present disclosure.

Leaf nodes of the structured data are then traversed to identify headers to be added to the table. This is illustrated at operation 710. In embodiments, a schema can be built using objects within the structured data and the schema can be parsed to identify all leaf nodes. In some embodiments, an existing schema is provided as a generic specification for the input data. In other words, the same schema can be used for processing a large number of objects that include the same structure and semantics. Leaf nodes are then added to a header list. FIG. 8 depicts an example schema 810 with leaf nodes identified and added to a header list 815. In embodiments, the header list can be the same as, or substantially similar to, header lists 310 and 315 depicted in FIG. 3.

A governing array is then built for each array object within the structured data. This is illustrated at operation 715. The arrays can be the same as, or substantially similar to, the arrays described with respect to operation 215 of FIG. 2, arrays 320 of FIG. 3, or arrays 515-530 of FIGS. 5-6. When there are no array objects in the structured data, the parsing and conversion can be simple and straightforward to perform.

Headers on the header list are then added to the tabular data format. The headers can be represented by fully qualified path names or be hierarchically organized. An example table 815 depicting headers added from a header list identified from a data structure 805 is depicted in FIG. 8.

Data from the structured data is then added to the tabular data format underneath each header. This is illustrated at operation 720. The governing array built from the structured data can be used to place the data into the correct columns/rows on the table. In embodiments, computer instructions can be used to dump the data within each array into a proper location (e.g., corresponding to the array) on the table. An example depicting the dumping of data underneath headers of a table is depicted in FIG. 9.

The aforementioned operations can be completed in any order and are not limited to those described. Additionally, some, all, or none of the aforementioned operations can be completed, while still remaining within the spirit and scope of the present disclosure.

Referring now to FIG. 8, shown is a diagram 800 depicting the identification of headers from structured data (e.g., data in a structured format) 805, in accordance with embodiments of the present disclosure. A schema 810 can be generated based on the data structure 805 or alternatively, provided separately. The schema 810 can be a root tree structure with a root node and leaf nodes based on object hierarchy within the data structure 805. The leaf nodes can be parsed and added to a header list. The header list can then be added to a table 815. The header list can be in any suitable format. As shown in FIG. 8, the header list can be in a format with fully qualified path names. However, in embodiments, the header list can be hierarchically organized (e.g., see header list 315 of FIG. 3).

Figure 9:
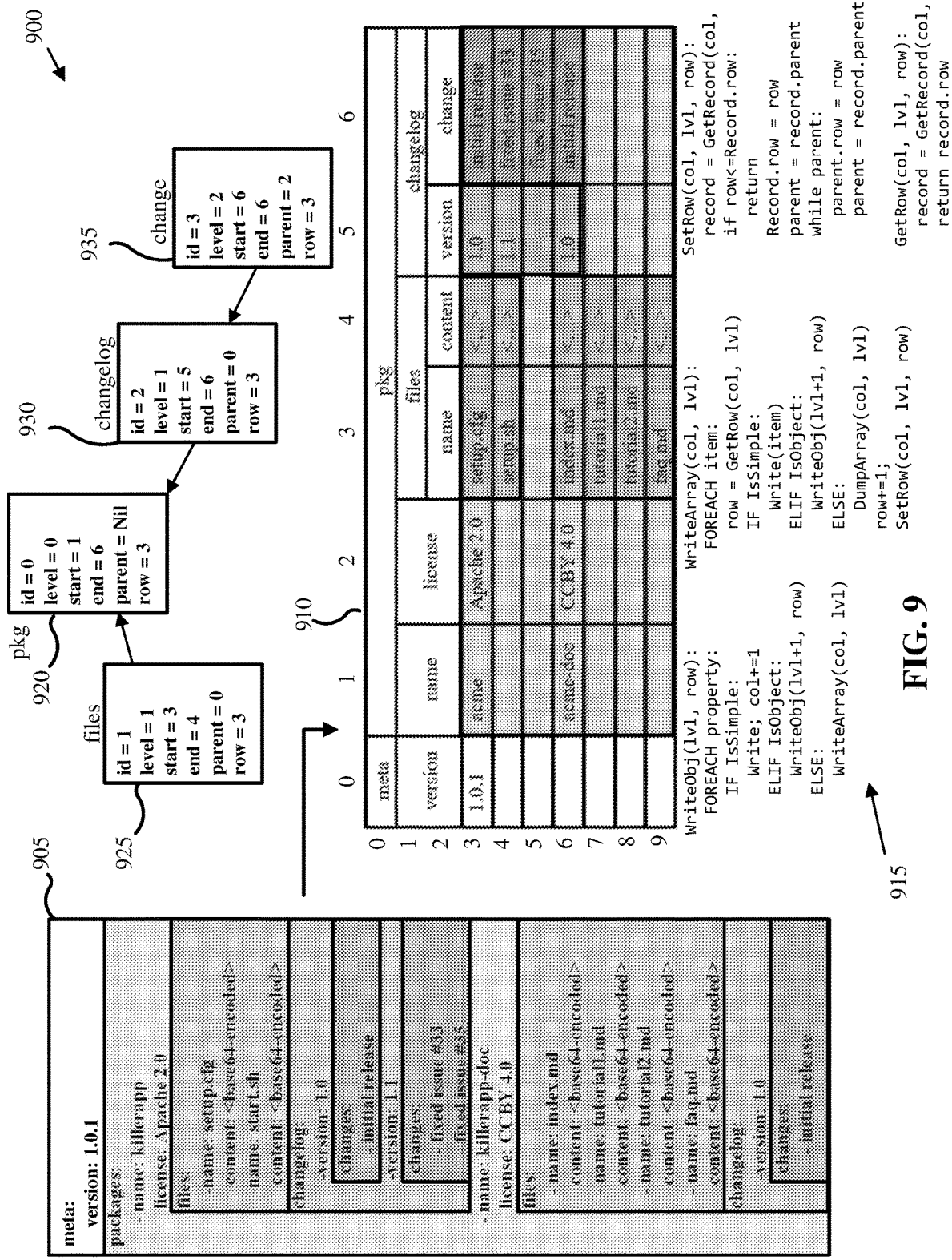
FIG. 9 is a diagram depicting the dumping of data from a structured format into a table using a governing array, in accordance with embodiments of the present disclosure.

Referring now to FIG. 9, shown is a diagram 900 depicting the dumping of data from a data structure 905 into a table 910. Objects 920-935 are generated for each array object within the structured data. A first object 920 corresponding to the array "pkg" has an identification (id) of 0, a level of 0 (e.g., "pkg" is at the highest hierarchy or "root node"), a starting column of 1, an ending column of 6, and no parent (nil), a second object 925 corresponding to the array "files" has an id of 1, a level of 1, a starting column of 3, an ending column of 4, and a parent with the id of 0, a third object 930 corresponding to array "changelog" has an id of 2, a level of 1, a starting column of 5, an ending column of 6, and a parent with the id of 0, and a fourth object 935 corresponding to array "change" has an id of 3, a level of 2, a starting column of 6, and ending column of 6, and a parent with the id of 2. The characteristics stored in each array are used to place data from the data structure 905 into the table 910. Example code 915 depicts an example script that can be used to dump data from the data structure 905 into the table 910 using arrays 920-935.

As shown in code 915, the "WriteObj" procedure can be used to dump an arbitrary object from the data structure 905. If a property of the object is an array, it can be handled separately using the "WriteArray" procedure, or else the procedure can write out the simple properties directly or invoke "WriteObj" recursively for nested objects. The "WriteArray" procedure can iterate through the items in an array and handle each item based on its data type. After each item is handled, the "SetRow" procedure can be called to record the current row number. By doing this, the maximum number of rows touched by an object can be remembered so that when the next object is dumped (for example, using "WriteObj"), the data can be dumped to the correct row.

Figure 10:
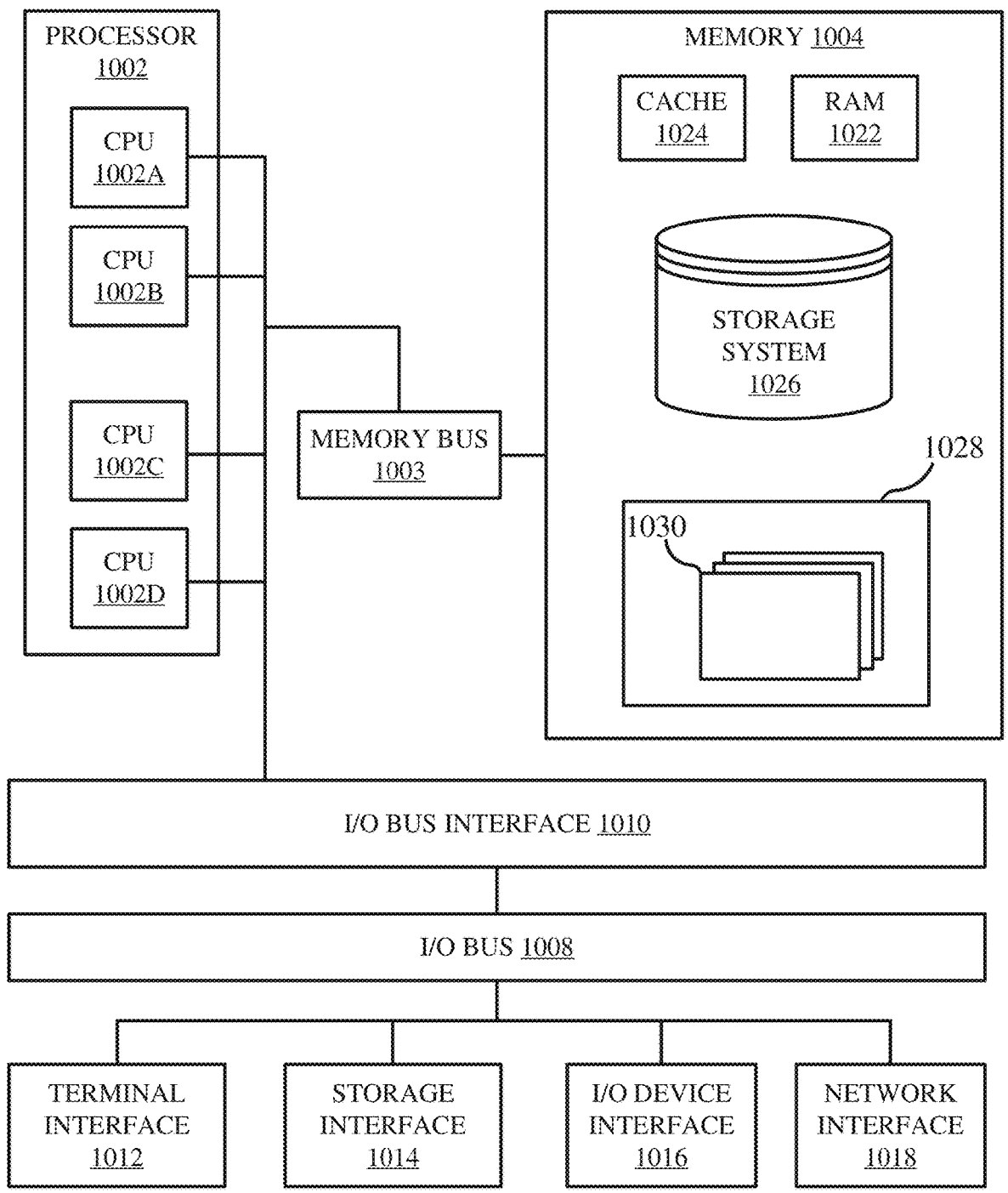
FIG. 10 is a high-level block diagram illustrating an example computer system that can be used in implementing one or more of the methods, tools, and modules, and any related functions, described herein, in accordance with embodiments of the present disclosure.

Referring now to FIG. 10, shown is a high-level block diagram of an example computer system 1001 (e.g., devices 105 and server 135) that can be used in implementing one or more of the methods, tools, and modules, and any related functions, described herein (e.g., using one or more processor circuits or computer processors of the computer), in accordance with embodiments of the present disclosure. In some embodiments, the major components of the computer system 1001 can comprise one or more CPUs 1002, a memory subsystem 1004, a terminal interface 1012, a storage interface 1014, an I/O (Input/Output) device interface 1016, and a network interface 1018, all of which can be communicatively coupled, directly or indirectly, for inter-component communication via a memory bus 1003, an I/O bus 1008, and an I/O bus interface unit 1010.

The computer system 1001 can contain one or more general-purpose programmable central processing units (CPUs) 1002A, 1002B, 1002C, and 1002D, herein generically referred to as the CPU 1002. In some embodiments, the computer system 1001 can contain multiple processors typical of a relatively large system; however, in other embodiments the computer system 1001 can alternatively be a single CPU system. Each CPU 1002 can execute instructions stored in the memory subsystem 1004 and can include one or more levels of on-board cache.

System memory 1004 can include computer system readable media in the form of volatile memory, such as random access memory (RAM) 1022 or cache memory 1024. Computer system 1001 can further include other removable/non-removable, volatile/non-volatile computer system storage media. By way of example only, storage system 1026 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 1004 can include flash memory, e.g., a flash memory stick drive or a flash drive. Memory devices can be connected to memory bus 1003 by one or more data media interfaces. The memory 1004 can include at least one program product having a set (e.g., at least one) of program modules that are configured to carry out the functions of various embodiments.

One or more programs/utilities 1028, each having at least one set of program modules 1030 can be stored in memory 1004. The programs/utilities 1028 can include a hypervisor (also referred to as a virtual machine monitor), one or more operating systems, one or more application programs, other program modules, and program data. Each of the operating systems, one or more application programs, other program modules, and program data or some combination thereof, can include an implementation of a networking environment. Programs 1028 and/or program modules 1030 generally perform the functions or methodologies of various embodiments.

Although the memory bus 1003 is shown in FIG. 10 as a single bus structure providing a direct communication path among the CPUs 1002, the memory subsystem 1004, and the I/O bus interface 1010, the memory bus 1003 can, in some embodiments, include multiple different buses or communication paths, which can be arranged in any of various forms, such as point-to-point links in hierarchical, star or web configurations, multiple hierarchical buses, parallel and redundant paths, or any other appropriate type of configuration. Furthermore, while the I/O bus interface 1010 and the I/O bus 1008 are shown as single respective units, the computer system 1001 can, in some embodiments, contain multiple I/O bus interface units 1010, multiple I/O buses 1008, or both. Further, while multiple I/O interface units are shown, which separate the I/O bus 1008 from various communications paths running to the various I/O devices, in other embodiments some or all of the I/O devices can be connected directly to one or more system I/O buses.

In some embodiments, the computer system 1001 can be a multi-user mainframe computer system, a single-user system, or a server computer or similar device that has little or no direct user interface, but receives requests from other computer systems (clients). Further, in some embodiments, the computer system 1001 can be implemented as a desktop computer, portable computer, laptop or notebook computer, tablet computer, pocket computer, telephone, smart phone, network switches or routers, or any other appropriate type of electronic device.

It is noted that FIG. 10 is intended to depict the representative major components of an exemplary computer system 1001. In some embodiments, however, individual components can have greater or lesser complexity than as represented in FIG. 10, components other than or in addition to those shown in FIG. 10 can be present, and the number, type, and configuration of such components can vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
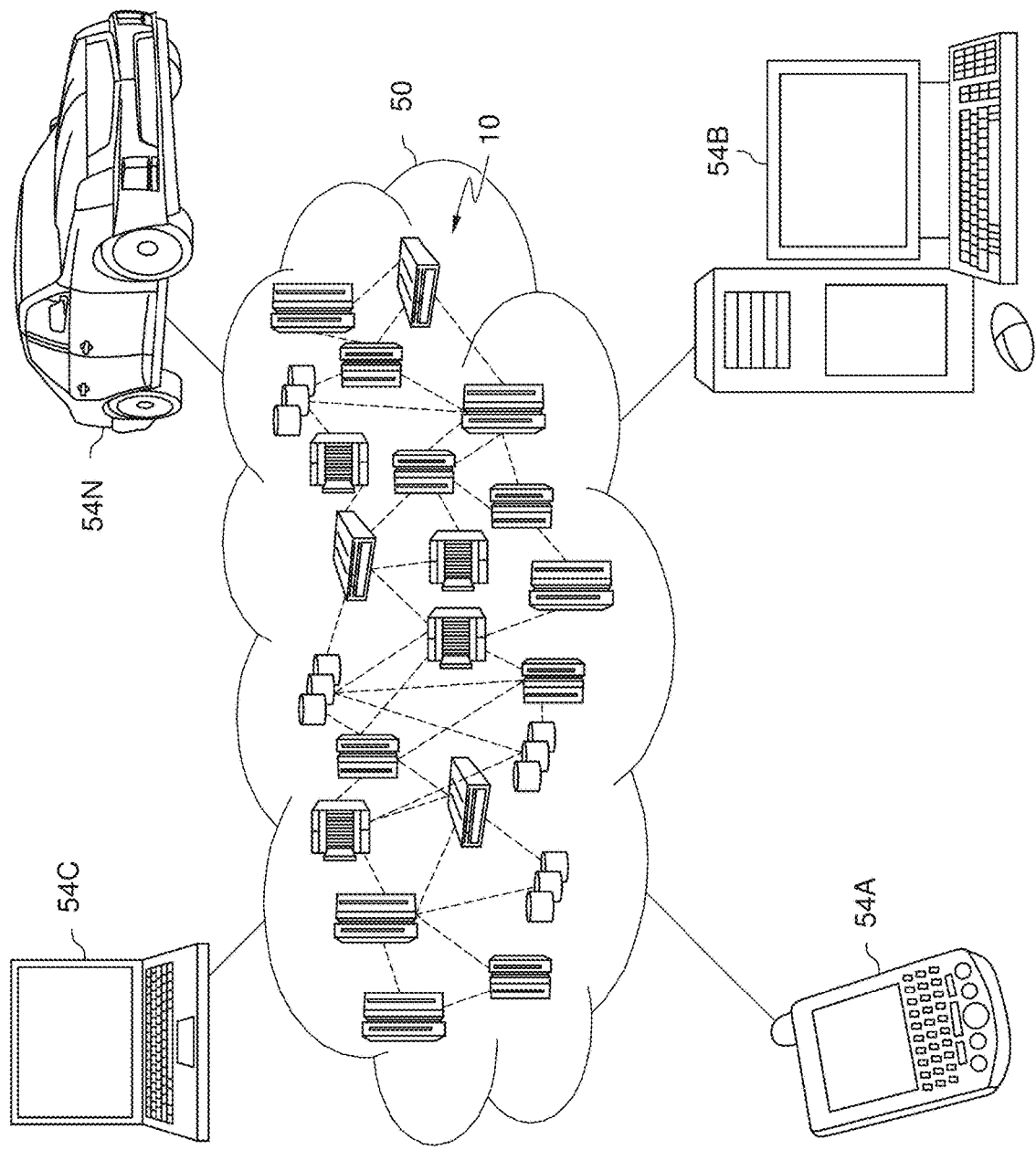
FIG. 11 is a diagram illustrating a cloud computing environment, in accordance with embodiments of the present disclosure.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A (e.g., devices 105), desktop computer 54B (e.g., server 135), laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
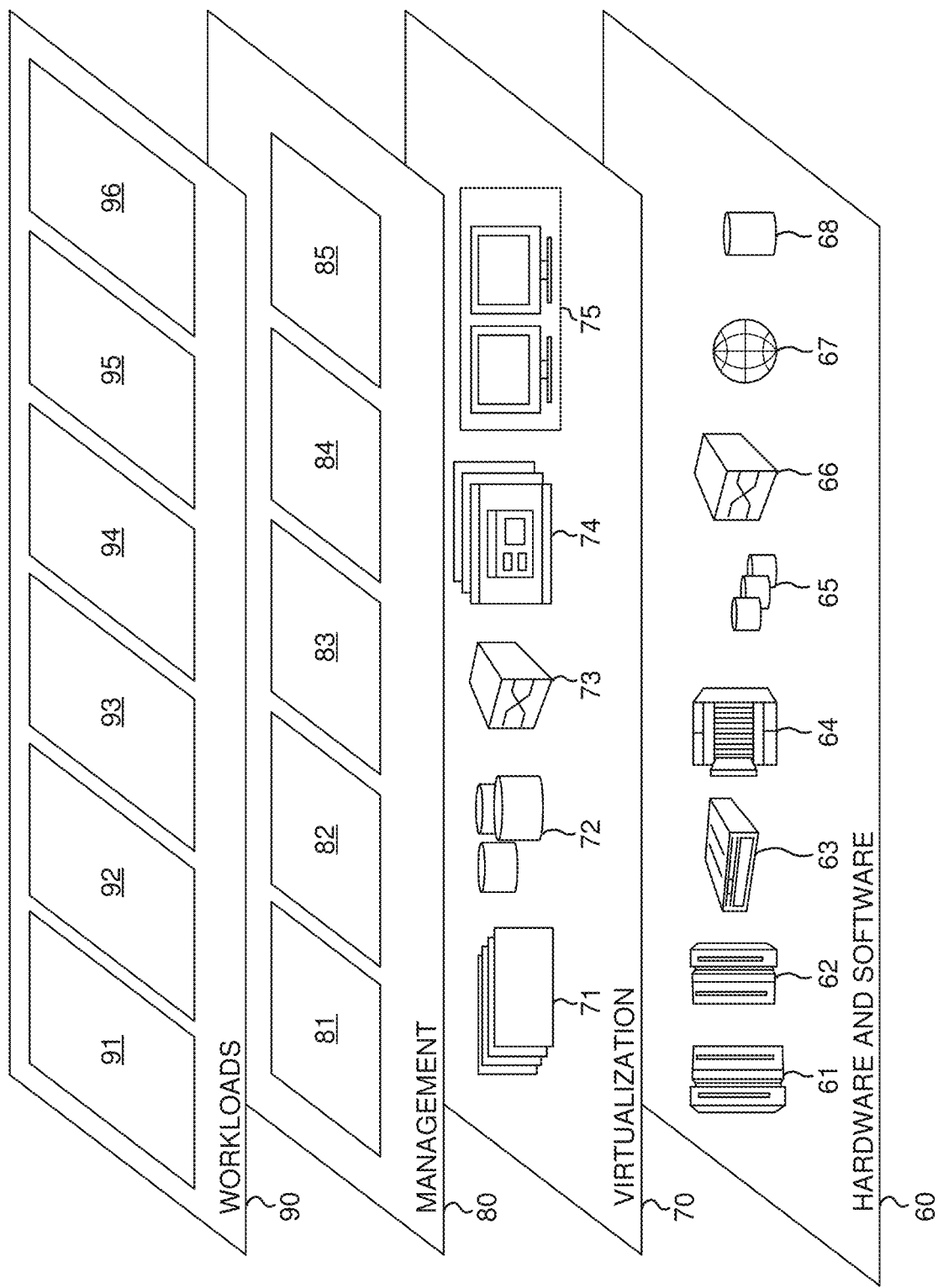
FIG. 12 is a block diagram illustrating abstraction model layers, in accordance with embodiments of the present disclosure.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data format conversion processing 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for converting data in a tabular format to a structured format, the method comprising:
   receiving data stored in the tabular format;
   identifying headers within the data stored in the tabular format;
   building an array for each of a plurality of objects within the data in the tabular format, each object corresponding to at least one identified header of the identified headers;
   parsing a data row using at least one of the built arrays and adding data within the data row to the structured format in a specific location based on characteristics indicated in the at least one array; and
   converting the data of the tabular format into the structured format by at least the identifying of the headers within the tabular format, and also converting the structured format into the tabular format.

2. The method of claim 1, wherein headers are identified based on a schema generated from the data in the tabular format, wherein each leaf node within the schema is selected as a header.

3. The method of claim 1, further comprising:
   parsing a next data row using at least one of the built arrays and adding data within the next data row to the structured format in a second specific location based on characteristics indicated in the at least one array;
   determining that the next data row is a last data row; and
   determining that the data has been converted from the tabular format to the structured format.

4. The method of claim 1, wherein after receiving the data in the tabular format, the data in the tabular format is normalized.

5. The method of claim 1, wherein after receiving the data in the tabular format, a header depth of the data in the tabular format is determined such that data is not dumped within the header depth.

6. The method of claim 1, further comprising:
parsing a second data row using at least one of the built arrays and adding data within the second data row to the structured format in a second specific location based on characteristics indicated in the at least one array; and
parsing a third data row using at least one of the built arrays and adding data within the third data row to the structured format in a third specific location based on characteristics indicated in the at least one array.

7. A computer program product comprising a computer readable storage medium having program instructions embodied therewith, wherein the computer readable storage medium is not a transitory signal per se, the program instructions executable by a processor to cause the processor to perform a method comprising:
receiving data stored in a structured format;
selecting leaf nodes of a schema representing hierarchy of objects within the structured format as headers;
adding the headers to a tabular format;
building an array for each object within the structured format; and
adding data from the structured format to the tabular format using at least one of the built arrays by storing data in proper rows and columns of the tabular format based on characteristics included in each array.

8. The computer program product of claim 7, wherein the schema is generated using the data in the structured format.

9. The computer program product of claim 7, wherein the schema is separately received along with the data in the structured format.

10. The computer program product of claim 7, wherein the headers added to the tabular format are hierarchically organized.

11. The computer program product of claim 7, wherein the headers added to the tabular format include qualified path names.

12. The computer program product of claim 7, wherein particular rows and columns within the tabular format are shaded with particular colors based on corresponding arrays that cover the particular rows and columns within the tabular format.

13. The method of claim 1, wherein the converting the data of the structured format into the tabular format comprises:
selecting leaf nodes of a schema representing hierarchy of objects within the structured format as headers;
adding the headers to the tabular format; and
adding the data from the structured format to the tabular format using the at least one of the built arrays.

14. The method of claim 13, wherein the structured format includes at least one of JavaScript Object Notation (JSON), YAML Ain't Markup Language (YAML), and Extensive Markup Language (XML) which is converted to the tabular format.

15. A system comprising:
at least one memory; and
at least one processor, wherein the at least one processor is configured to perform a method comprising:
receiving data stored in a tabular format;
identifying headers within the data stored in the tabular format;
building an array for each of a plurality of objects within the data in the tabular format, each object corresponding to at least one identified header of the identified headers;
parsing a data row using at least one of the built arrays and adding data within the data row to the structured format in a specific location based on characteristics indicated in the at least one array;
determining that the data has been converted from the tabular format to the structured format; and
after the data has been converted from the tabular format to the structured format, converting the data back into the tabular format, which comprises:
selecting leaf nodes of a schema representing hierarchy of objects within the structured format as headers;
adding the headers to the tabular format; and
adding data from the structured format to the tabular format using at least one of the built arrays by storing data in proper rows and columns of the tabular format based on characteristics included in each array.

16. The system of claim 15, wherein headers are identified based on a schema generated from the data in the tabular format, wherein each leaf node within the schema is selected as a header.

17. The system of claim 15, wherein the method performed by the processor further comprises:
parsing a next data row using at least one of the built arrays and adding data within the next data row to the structured format in a second specific location based on characteristics indicated in the at least one array; and
determining that the next data row is a last data row.

18. The system of claim 15, wherein after receiving the data in the tabular format, the data in the tabular format is normalized.

19. The system of claim 15, wherein after receiving the data in the tabular format, a header depth of the data in the tabular format is determined.

20. The system of claim 15, wherein the method performed by the processor further comprises:
parsing a second data row using at least one of the built arrays and adding data within the second data row to the structured format in a second specific location based on characteristics indicated in the at least one array; and
parsing a third data row using at least one of the built arrays and adding data within the third data row to the structured format in a third specific location based on characteristics indicated in the at least one array.

* * * * *